United States Patent [19]

Mueller

[11] 3,827,369
[45] Aug. 6, 1974

[54] WHEELBARROW HAVING SPHERICAL WHEEL

[76] Inventor: Harry B. Mueller, 938 Queen Dr., West Chester, Pa. 19280

[22] Filed: Oct. 2, 1972

[21] Appl. No.: 293,765

[52] U.S. Cl.............. 104/118, 104/1 A, 152/352, 280/47.31
[51] Int. Cl........................ B61b 13/00, B62b 1/18
[58] Field of Search ........... 280/47.31, 47.3; 297/3; 152/9, 352; 104/1 A, 118; 105/142

[56] References Cited
UNITED STATES PATENTS

| | | | |
|---|---|---|---|
| 476,764 | 6/1892 | Hall | 152/9 |
| 646,869 | 4/1900 | Perkes | 280/47.31 |
| 674,710 | 5/1901 | Peirce | 280/47.31 X |
| 1,394,328 | 10/1921 | Miller | 280/DIG. 7 |
| 2,787,970 | 4/1957 | Bennett | 105/142 X |

FOREIGN PATENTS OR APPLICATIONS

| | | | |
|---|---|---|---|
| 603,497 | 4/1960 | Italy | 280/47.31 |

Primary Examiner—David Schonberg
Assistant Examiner—John A. Pekar
Attorney, Agent, or Firm—Howson & Howson

[57] ABSTRACT

A wheelbarrow having a hopper and a frame with handles at one end is provided with a spherically shaped wheel which is rotatably mounted by means of an axle and bearings at the other end of the frame to support the frame. The spherical wheel permits the frame to be pivoted readily about a vertical axis even when the wheel is engaged in a channel such as between parallel track-rails. In one embodiment, the spherical wheel contains a toroidal inner tube which grips the axle when inflated so that the axle rotates in the bearings mounted on the frame. In another embodiment, the spherical wheel is tubeless, and aligned stub shafts extend outwardly in opposite directions from the sidealls of the spherical wheel for rotation in the bearings mounted on the frame.

7 Claims, 5 Drawing Figures

PATENTED AUG 6 1974 3,827,369
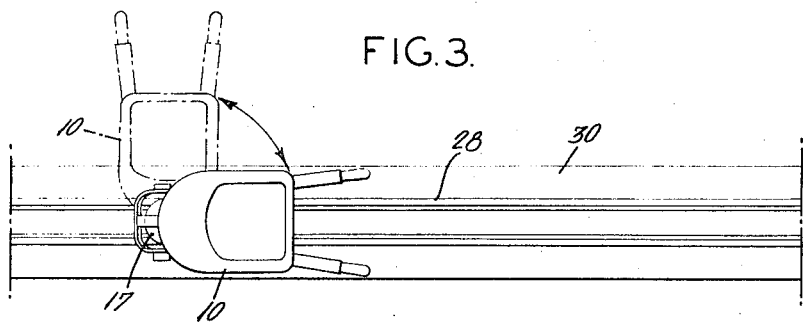
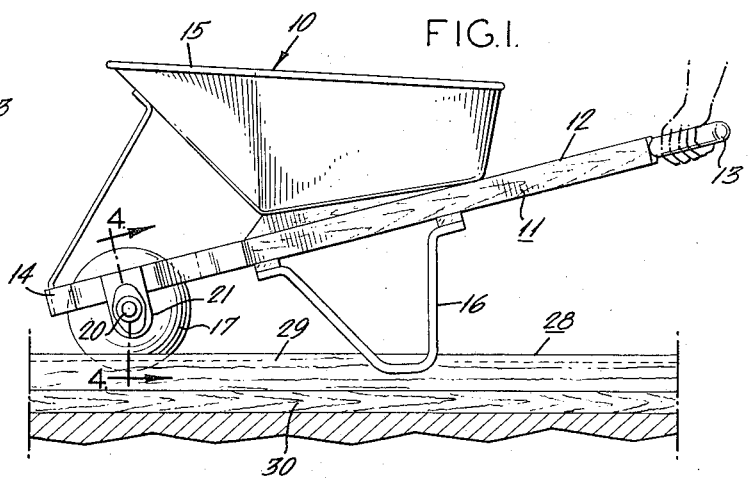
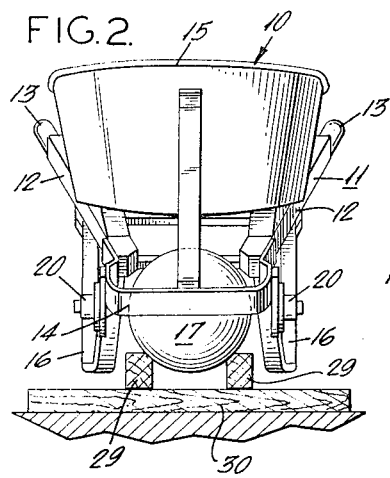
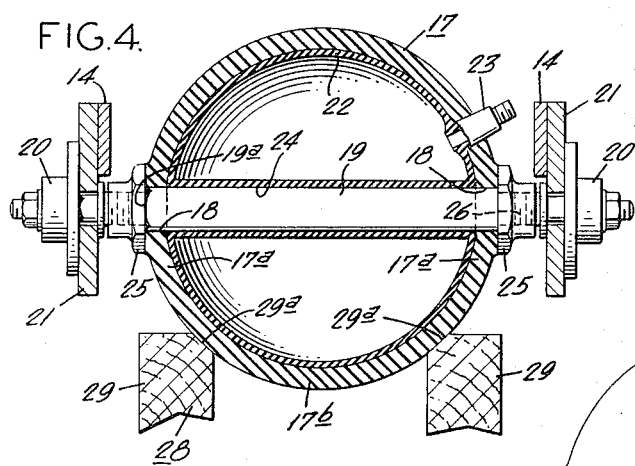
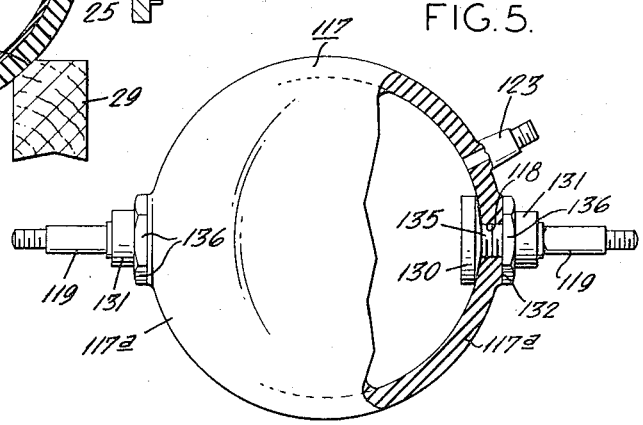

WHEELBARROW HAVING SPHERICAL WHEEL

The present invention relates to manually propelled load-carrying vehicles such as wheelbarrows.

In many phases of construction, wheelbarrows are employed to transport building materials such as concrete, blocks, etc. from place to place in and about a construction site. In certain situations, for instance when it is necessary to convey the materials from one level to another, the wheelbarrows are guided on inclined planks to their destinations where they may be pivoted relative to the plank for dumping the building materials alongside the plank.

There are certain hazards associated with the foregoing procedure. For example, it is difficult for a workman to push a loaded wheelbarrow safely on a plank. Thus, when the plank is elevated so as to pass over other workmen, the possibility exists that one or more of the other workmen may be injured unless the workmen on the plank is extremely cautious while pushing the wheelbarrow and dumping its contents.

In addition to the aforementioned situation, there may be occasions in which the wheel of a loaded wheelbarrow may become trapped in a channel, such as a shallow ditch. If the channel is narrow and has steep sides it may be difficult if not impossible to extract the wheelbarrow without pushing the wheelbarrow to terminus of the channel or unloading the wheelbarrow. This is because substantially planar configuration of the wheel prevents the wheelbarrow from being pivoted readily about a vertical axis to enable the workman to push or pull the wheelbarrow in a direction normal to the channel.

With the foregoing in mind, it is a primary object of the present invention to provide an improved wheelbarrow which is capable of being operated safely in and about a construction site.

It is another object of the present invention to provide a novel wheelbarrow having a spherical wheel which cooperates with a track to enable the wheelbarrow to be guided safely while permitting the wheelbarrow to be pivoted readily about a vertical axis through the wheel for dumping materials from the wheelbarrow.

As a further object, the present invention provides a wheelbarrow which is capable of being extracted readily from a narrow channel even when loaded.

More specifically, in the present invention, a wheelbarrow having a hopper and a frame with handles at one end is provided with a spherically shaped wheel for supporting the other end of the frame. The wheel is of pneumatic construction and is rotatably mounted to the frame by means of an axle and bearings. In one embodiment, the spherical wheel has an inner tube of toroidal shape which grips the axle when the tube is inflated to cause the axle to rotate only in the bearings. In another embodiment, the axle is provided by means of aligned stub shafts which extend outwardly in opposite directions from the sidewall of the wheel, and the stub shafts rotate in the bearings mounted on the frame. A track including a plank mounting parallel rails is provided to enable the wheelbarrow to be guided safely. The rails are located sufficiently close as to engage the lower sides of the spherical wheel and to space the bottom of the wheel from the plank for permitting the wheelbarrow to be pivoted readily about a vertical axis through the wheel.

These and other objects, features and advantages of the present invention should become apparent from the following description when taken in conjunction with the accompanying drawings, in which:

FIG. 1 is a side elevational view of a wheelbarrow embodying the present invention;

FIG. 2 is a front end elevational view of the wheelbarrow of FIG. 1;

FIG. 3 is a plan view in reduced scale illustrating the wheelbarrow of the present invention on a track;

FIG. 4 is an enlarged sectional view taken along line 4—4 of FIG. 1 to illustrate a tube-type wheel for the wheelbarrow of the present invention; and FIG. 5 is partly sectioned view similar to FIG. 4 but of a tubeless type of wheel for the wheelbarrow of the present invention.

Referring now to the drawing, there is illustrated in FIG. 1 a wheelbarrow 10 which embodies the present invention. As illustrated therein, the wheelbarrow 10 has an inclined frame 11 which includes a pair of rigid, elongated frame elements 12, 12 each of which has a handle 13 at one end. The other ends of the frame elements 12, 12 are fastened together by means of a strap and bracing assembly 14. A hopper 15 is carried on the frame 11, and a pair of support legs 16, 16 depend from the frame 11 below the hopper 10 for supporting the wheelbarrow 10 in the customary manner.

As described thus far, the wheelbarrow 10 is conventional.

According to the present invention, the wheelbarrow 10 is provided with a novel wheel 17 which is shaped to enable the wheelbarrow 10 to be operated more safely than a conventional wheelbarrow. To this end, the wheel 17 is substantially spherical and is rotatably mounted at the front end of the wheelbarrow 10 in place of the conventional wheel. In the present instance, the wheel 17 is mounted to the frame elements 12, 12 by means of a horizontally disposed axle 19 which rotates in bearings 20, 20 which are mounted to plates 21, 21 depending from the front ends of the frame elements 12, 12.

Preferably, the wheel 16 is of hollow pneumatic construction and contains an inner tube 22 which has an inflation stem valve 23 located adjacent the axle 19. In the illustrated embodiment, the inner tube 22 has a toroidal shape with a through bore 24 which axially receives the axle 19. Thus, when the tube 22 is inflated it frictionally grips the axle 19 so that the ends of the axle 19 rotate only in the bearings 20, 20.

As best seen in FIG. 4, the wheel 17 is centered on the axle 19 by means of lock nuts 25, 25 which are threaded on external threads 26, 26 located adjacent the ends of axle 19. The axle 19 is shouldered at 19a to prevent the lock nuts 25, 25 from being drawn too tightly and possibly flattening the sidewalls 17a, 17a of the wheel 17. It is noted that the wheel 17 is provided with horizontally aligned bores 18, 18 which, in an addition to axially receiving the axle 19, are sized sufficiently large to enable the inner tube 22 to be inserted inside the wheel 17.

The spherical shape of the wheel 17 permits the wheelbarrow 10 to be operated in a safe manner when used in conjunction with a guide track 28 (FIGS. 3 and 4). In the present instance, the track 28 has rails 29, 29 which are secured in parallel relation by tie means which in the illustrated embodiment includes a plank 30. As best seen in FIG. 4, the rails 29, 29 are spaced apart so as to engage the lower portions of the sidewalls 17a, 17a of the wheel 17 inwardly of its bearing supports 20, 20 to space the bottom 17b of the wheel 17 from the underlying plank 30 (see FIG. 2). With this structure, the rails 29, 29 provide a positive means for preventing the wheelbarrow 10 from moving laterally when being advanced in either the forward or rearward direction such as illustrated in full lines in FIG. 3; however, the rails 29, 29 permit the wheelbarrow 10 to be pivoted readily about a vertical axis through the wheel 17 to enable the contents of the wheelbarrow to be dumped alongside the track 28. If desired, the upper inside edges 29 a, 29a of the rails 29, 29 may be beveled to mate with the wheel 17 and to reduce wear on the wheel 17.

It is noted that a workman may readily engage or disengage the wheelbarrow 10 with the track 28 simply by pushing or pulling the wheelbarrow 10 in a direction normal to the track 28. Although some effort is required to engage and disengage a loaded wheelbarrow 10 with the track 28, it should be apparent that such engagement and disengagement is more readily effected when the wheelbarrow 10 is displaced normal to the track 28 rather than at an acute angle. Moreover, it is noted that in the event that the wheel 17 should become trapped in a narrow channel, such as a shallow ditch, the wheelbarrow 10 may be pivoted readily into a position normal to the ditch to permit a workman to extricate the wheelbarrow simply by pushing or pulling the wheelbarrow 10. As a result, the wheelbarrow 10 may be withdrawn safely from the ditch without unloading its hopper 15.

A tubeless spherical wheel 117 may be employed in lieu of the tube-type wheel 17 described above. As best seen in FIG. 5, an axle for the wheel 117 is provided by means of a pair of aligned stub shafts 119, 119 which extend outwardly in opposite directions from the sidewalls 117a, 117a of the wheel 117. Each stub shaft 119, such as the right one in FIG. 5, has an inner plate 130 with a convex surface which engages the interior of the sidewall 117a and an outer plate 131 which engages a flat 132 molded on the exterior of the sidewall 117a of the wheel 117. The outer plate 131 slides axially on the stub shaft 119 and is internally threaded to mate with external threads 135 on the shaft 119. A series of wrench flats 136, 136 are provided on the outer plate 131 to enable the inner and outer plates 130 and 131 to be drawn together tightly for securing the stub shaft 119 to the wheel 117. Preferably, the wheel 117 is fabricated of a material such as rubber which is sufficiently elastic as to permit the inner plate 130 to pass through a stub shaft bore 118 in the sidewall 117a. An inflation valve 123 is provided adjacent the stub shaft 119 to inflate the wheel. It is noted that when inflated, pressure inside the wheel 117 tends to force the inner plate 136 against the inside of the sidewall 117a to minimize leakage. If desired, a sealant may be provided between the inner plate 136 and the sidewall to completely eliminate leakage of air. The absence of an inner tube in the wheel 117 enables manufacturing economies to be effected by eliminating the cost of a tube.

In view of the foregoing, it should be apparent that there has now been provided an improved wheelbarrow which is capable of being operated safely with or without a special track.

While preferred embodiments of the present invention have been described in detail, various modifications, alterations and changes may be made without departing from the spirit and scope of the present invention as defined in the appended claims.

I claim:

1. In combination with a wheelbarrow having a hopper, frame means carrying the hopper, handle means at one end of said frame means, and rotatable means supporting the other end of said frame means including a substantially spherical wheel having sidewalls, an axle for said wheel, and bearing means rotatably mounting said wheel to said other end of said frame means, a track having tie means mounting parallel rails for engaging said spherical wheel to guide said wheelbarrow positively in forward and rearward directions, said rails being spaced apart to engage lower portions of said wheel sidewalls to support the bottom of the wheel above said tie means.

2. Apparatus according to claim 1 wherein said spherical wheel is of hollow pneumatic construction and including an inflation valve located adjacent said axle.

3. Apparatus according to claim 2 wherein said inflation valve comprises a stem valve extending radially outward from the outer casing of said spherical wheel.

4. Apparatus according to claim 2 wherein said wheel includes an inner tube.

5. Apparatus according to claim 4 wherein said inner tube has a toroidal shape with a cylindrical bore and said axle is mounted in said bore, said axle being fixed against rotation relative to the tube when said tube is pressurized so that said axle rotates only in said bearing means.

6. Apparatus according to claim 1 wherein said rails have beveled edges for engaging said sidewalls.

7. In a wheelbarrow having a hopper; frame means carrying the hopper; handle means at one end of said frame means; and rotatable means supporting the other end of said frame means; the improvement wherein said rotatable means includes a substantially spherical wheel; an axle for said wheel; and bearing means rotatably mounting said wheel to said other end of said frame means; said spherical wheel being of hollow pneumatic construction having sidewalls and including an inflation valve located adjacent said axle; said axle including a pair of aligned stub shafts extending outwardly from said sidewalls; means mounting each of said stub shafts to said sidewalls, including an inner plate carried at one end of each shaft and having a convex surface engaging the interior of said sidewall, an outer plate slidable axially on said shaft and engaging the exterior of said sidewall, and means interengaging said outer plate and said shaft to maintain said inner and outer plates engaged with said sidewall; said interengaging means including an internally threaded bore in said outer plate and external threads on said shaft matingly engaging said internally threaded bore, and wrench-engaging means carried on said outer plate for rotating the same relative to the shaft; whereby said wheelbarrow may be readily pivoted relative to its normal path of movement about a vertical axis through the wheel.

* * * * *